(No Model.)
C. G. PICARD.
APPARATUS FOR MOLDING FANCY ARTICLES IN GLASS, CRYSTAL, &c.
No. 259,203. Patented June 6, 1882.
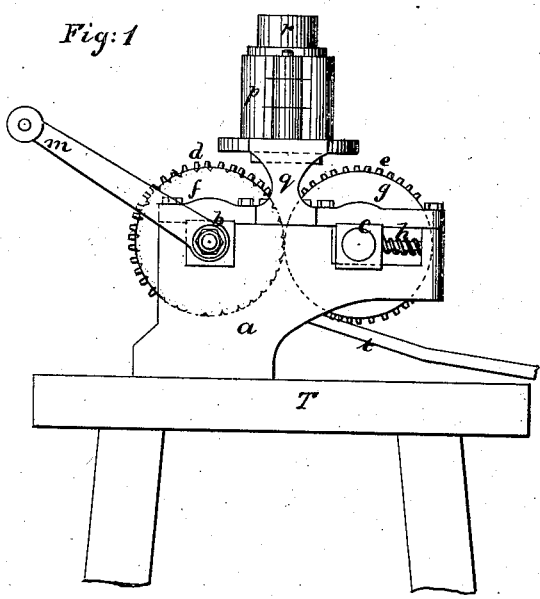
Fig: 1.
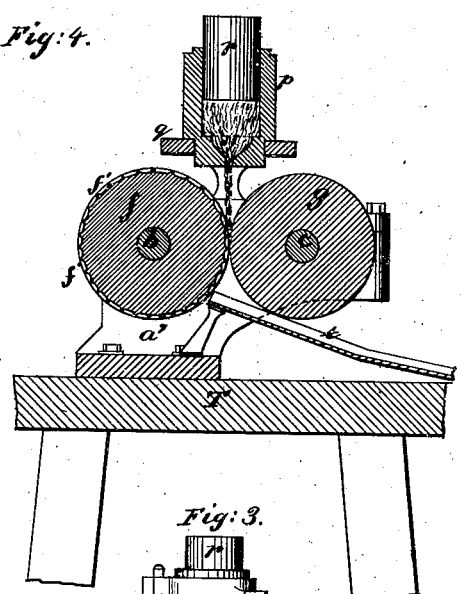
Fig: 4.
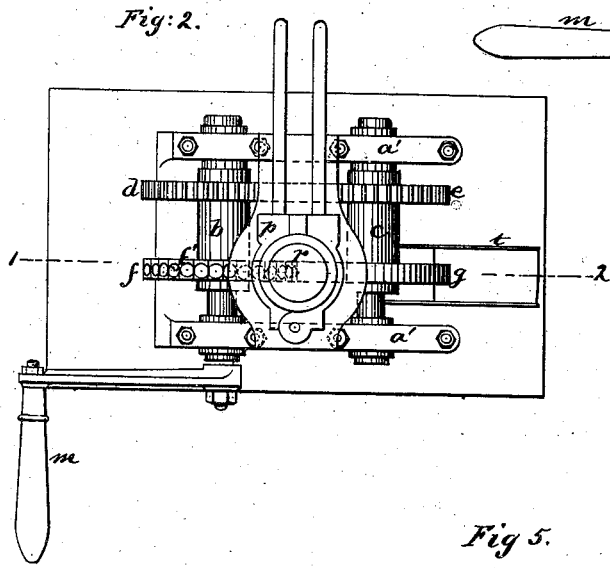
Fig: 2.
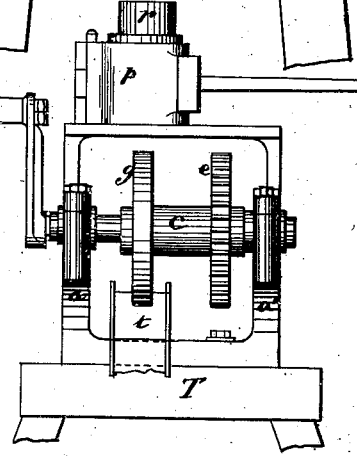
Fig: 3.
Fig 5.
Witnesses:
John C. Tunbridge
John M. Speer
Inventor:
Charles G. Picard
by his attorneys
Briesen & Betts

UNITED STATES PATENT OFFICE.

CHARLES GASTON PICARD, OF PARIS, FRANCE.

APPARATUS FOR MOLDING FANCY ARTICLES IN GLASS, CRYSTAL, &c.

SPECIFICATION forming part of Letters Patent No. 259,203, dated June 6, 1882.

Application filed February 8, 1882. (No model.) Patented in France December 22, 1881; in Belgium January 10, 1882, and in England January 10, 1882, No. 126.

*To all whom it may concern:*

Be it known that I, CHARLES GASTON PICARD, manufacturer, of Paris, in the Republic of France, have invented an Apparatus for Molding Fancy Articles in Glass, Crystal, or Enamel, &c., (for which I have obtained Letters Patent of France, for fifteen years, dated December 22, 1881; Belgium, January 10, 1882, for fifteen years, and England, January 10, 1882, No. 126, for fourteen years;) and I do hereby declare that the following is a full and exact description thereof, reference being made to the accompanying drawings.

The present invention refers specially to molding fancy articles in glass, crystal, or enamel; but it is also applicable to molding small metal pieces, earthenware, ceramic ware, and, in general, all matters easy to mold in any form and of small dimensions. Articles that can thus be molded are intended for jewelry, trinkets, lenses, clocks, ceramics, &c., and any forms can be produced round—such as lenses, beads, stars, prisms, &c.

In principle the invention emanates from the rolling-mill, in that the matter in the condition required for molding is distributed at the point of contact of two disks or cylinders turning in contrary directions of an equal velocity, one of which disks is engraved or sunk on its surface or periphery of the form it is desired to impart to the object to be molded, the other disk being plain to produce the requisite pressure. In all cases the matter distributed in contact with the disks or cylinders fills up the cavities it encounters in one of the disks and finds itself firmly compressed there in the course of rotation of the said cylinders by the other plain-edged disk, and can then be removed from the mold, having embraced all the turns and forms of the mold resulting from the hollows and reliefs made accordingly on one of the disks or cylinders.

Figures 1 and 2 of the annexed drawings represent in elevation and plan a small hand-machine for making lenses of glass, crystal, or enamel of the description shown, Fig. 5. Fig. 3 is an end view, and Fig. 4 a vertical section following the line 1 2.

The cast-iron frame supports (by two parallel cheeks, $a\ a'$, in frames for the purpose) the cushions of two parallel shafts, C and $c$, on which are fixed the cog-wheels $d$ and $e$, of equal dimensions and of the same speed, the motion imparted to one being exactly repeated on the other. The shafts C and $c$ also receive the disks $f$ and $g$, both in the same plane, which are in contact following their line of center. These disks are rigorously equal in diameter, and one of them, $f$, is hollowed out, with the cavities $f'$ equidistant and identical, which exactly reproduce the form and dimensions of the object to be molded, Fig. 5. One of the faces, $x\ x'$, being plain or insensibly concave, the second disk, $g$, is loose throughout its circumference, its use being to simply close the molds hollowed in the disk $f$. Motion is communicated to the shaft C by the crank $m$, and it is regulated in its fixed intermittent motion by aid of two spring-buffers, which press firmly against the faces with which the bearings of the shaft $e$ are provided. These faces being equal and of the same number as the cavities $f'$ of the disk $f$, they produce stops in the movement sensible to the hand and sufficient to give the molds time to fill before receiving the pressure of the disk $g$. The matter to be molded—glass, crystal, enamel, or other substance—is poured into a cast-iron receptacle, $p$, in two hinged parts, which receptacle is adjusted in an aperture or support, $q$.

There is an opening for the flow of the matter just above the point of conduct of the disks $f$ and $g$. Its dimensions are determined according to the speed and the output of the machine. A cylinder, $r$, placed in the recipient $p$, presses on the matter to be molded to encourage the flow.

T is the table on which the frame $a\ a'$ is bolted, and which raises the machine the required height.

Action of the machine: If the matter emptied into $p$ is liquid glass, the glass falls between the disks $f$ and $g$ and fills the cavities as they present themselves. The glass lodged in the cavities of the disk $f$ is forcibly pressed at the line of contact of the disk $g$. The matter is in a manner rolled, and is then ready for removal from the mold, which is quite naturally effected by the simple weight of the molded piece. The completed pieces, which are without flaw, fall on an inclined table or plane, which is moved, as desired, to receive the molded pieces at a distance, from whence they are taken to be submitted to other operations—such as shaping or cutting, &c. Deformation of the pieces is prevented by covering the table with fine sand or other appropriate substance.

Observations: The machine can easily be continuously worked by hand or mechanically, the intermittent motion of the cylinders $f$ and $g$ being also effected. For this purpose it suffices to transform the continuous motor motion by shaft, click, and ratchet on one of the shafts C $c$. The disks $f$ and $g$ may be cylinders, on which the molds are sunk or engraved in one, two, or more circles, so that one or more similar or dissimilar objects can be molded simultaneously. The cylinders $f$ and $g$ may be hollowed, and heated or cold according as the matter to be molded requires to be kept hot or cold.

Finally, the matter to be molded, instead of being distributed in a continuous jet, as already described, may be distributed by drawers or other means—such as pockets, glass cans, and so on.

I do not claim molding by two contiguous disks when both are recessed, as in English Patent No. 12,101 of 1848. The requisite pressure cannot be obtained by such apparatus.

I claim as my invention—

The combination herein described of the recessed molding-disk $f$ with the plain edged pressure-disk $g$, and with mechanism for imparting intermittent motion to said disks, as specified.

CH. G. PICARD.

Witnesses:
A. BLÉTRY,
A. CAUFFLIER.